Patented Nov. 4, 1952

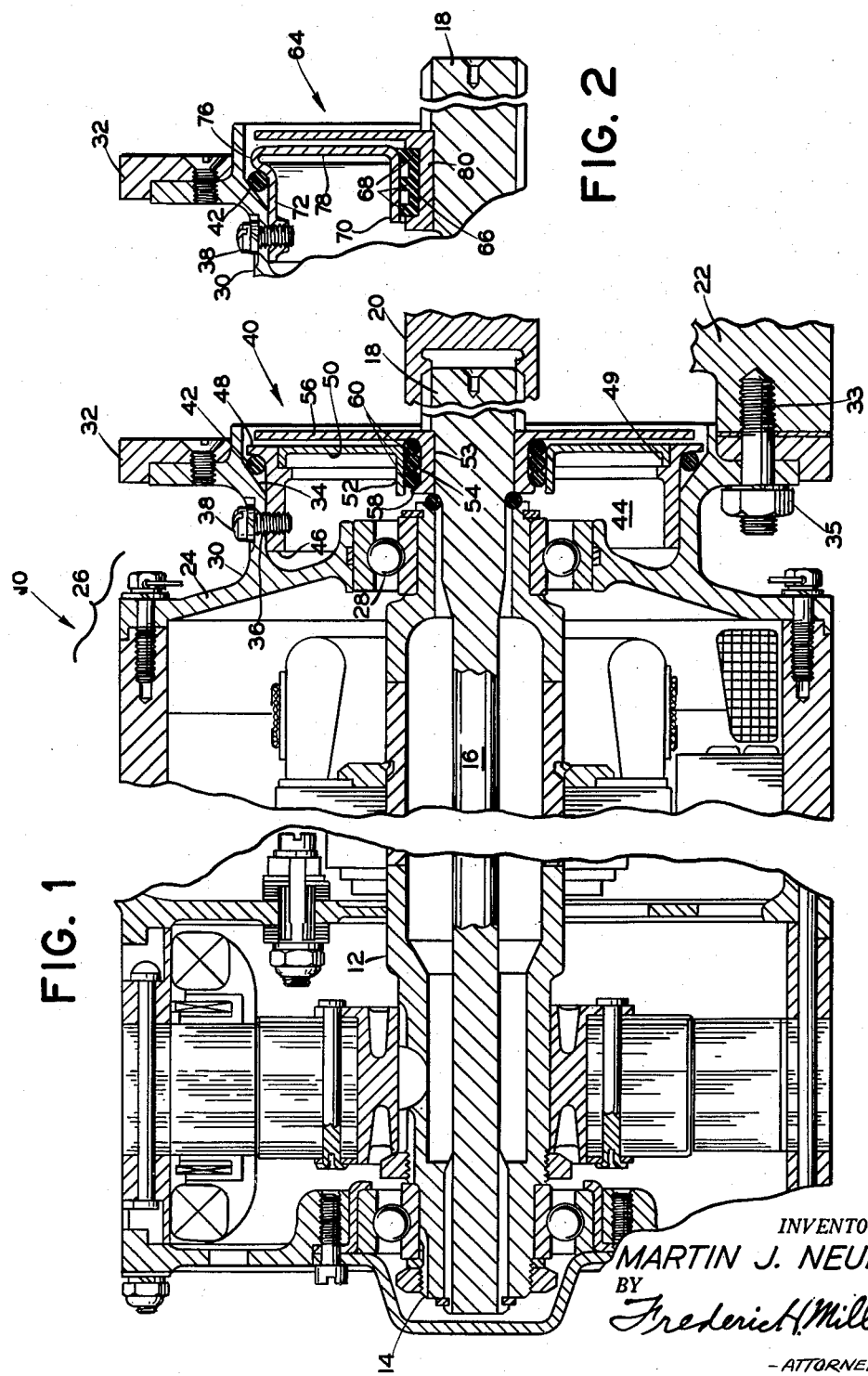

2,616,730

UNITED STATES PATENT OFFICE 2,616,730

FLUID SEAL FOR ROTATABLE SHAFTS

Martin J. Neuner, Fairview, N. J., assignor to Bendix Aviation Corporation, Teterboro, N. J., a corporation of Delaware Application May 3, 1948, Serial No. 24,795

1 Claim. (Cl. 286—7)

The invention hereof relates to fluid seals for rotatable shafts and the like, and particularly to an oil seal for cooperation with shaft means which extends between and into two housings or casings, one of which contains oil, to prevent the passage of the oil into the other housing.

Although adapted for other applications, the device is illustrated herein, by way of example, in association with an engine accessory, in the form of an electrical generator, the housing of which has heretofore included a tubular mounting head having a conical portion and an engine-end flange for mounting the generator on an engine case for driving the generator by the engine.

Certain former seals, attempted at this place, have failed very quickly by reason of the fact that, with one end of the relatively long shaft axially fixed, the positions of the stationary and movable elements of the seal near the other end of the shaft vary axially in different generators caused by different clearances between points along the shaft.

Among the objects of the invention is to provide novel seal means of the character indicated, which may be employed in the aforementioned mounting head, including the utilization of the conical portion, without any change therein, except for the provision, in the example given, of means such as drilled holes.

Another object is to provide a seal which is independent of the axial position of the seal point on the shaft, within limits, such that the stationary and movable elements of the seal means may be effectively positioned at any of a plurality of axial positions relative to each other.

Another object is to combine a stationary ring-gasket seal, of relatively great diameter, with a rotatable seal of considerably smaller diameter, to seal a large opening relative to a shaft of small diameter with substantially minimum rubbing contact.

Another object is to provide a novel seal and oil-slinger combination.

Another object is to provide a novel baffle element having a telescopic portion, a portion for axially compressing a large ring gasket, and a portion adapted for a selection of axial positions relative to small ring seal means.

Another object is to provide a device of the above-indicated character which is simple and durable in construction, economical to manufacture, and effective in its operation.

These and other objects and features of the invention will appear more fully hereinafter from a consideration of the following description taken in connection with the accompanying drawing wherein two embodiments of the invention are illustrated by way of example.

In the drawing:

Figure 1 is a fragmentary side view, partially in elevation and partially in section, of an engine accessory in the form of a generator embodying one form of the invention; and Figure 2 is a detail section of a modification of a portion of the structure of Figure 1.

As illustrated in Figure 1, one accessory or structure, for use with which the invention is adapted, is a generator 10 comprising a hollow armature shaft 12 adapted to be rotated from its outer, or left, end 14, as shown, by a quill shaft 16 extending through the generator shaft 12 to an end 18 for attachment to, and driving by, an element 20 of an engine which is otherwise represented by a portion 22 of its crank case.

An inner, or right, end member 24, of a housing 26 of the generator 10, includes a bearing 28 for the generator shaft 12. A tubular head 30, extending along the shafts 12 and 16 from the housing 26 has a radially outwardly extending engine-end flange 32 for mounting the generator 10 on the engine, as by studs 33 and nuts 35, in liquid tight relation thereto, against the case 22, and an axially outwardly converging substantially frusto-conical inner surface 34.

All of the parts set forth so far, and others which it is not deemed necessary to mention for a full understanding of the invention, are as they existed before, except for holes 36 for the reception of screws 38 for holding a device 40 of the invention in combination with, or operative relation to, the accessory 10.

The device 40 comprises a large gasket or ring seal 42, which, in this instance, is of round section and of rubber-like material, such as neoprene, of a diameter adapting it to engage the surface 34 between the inner and outer radial limits of the latter.

A member 44 comprises an axially extending collar portion 46 adapted to telescope the head 30 therein for detachable connection thereto, as by the screws 38. The member 44 has an annular portion 48 extending radially outwardly from the collar portion 46 for axially compressing the gasket 42 against the conical surface 34. A radial disc web 50 extends inwardly from the annular portion 48, and has, in this instance, an axially outwardly extending flange 49 press fitting the member 44, and a similarly extending tubular seal flange or element 52.

Means 53, in the form of a sleeve element, surrounding the quill shaft 16 for rotation therewith, is adapted to provide a groove or channel 54 about the quill shaft, and a thin sheet washer-like oil slinger 56 inside and close to the radial web 50 for extension radially to a position close to the gasket 42. The groove 54 is defined, as shown, by the slinger 56 on the right and by an annular shoulder 58 on the left.

Yieldable sealing means 60, in this instance in the form of three small rubber-like or neoprene rings of round-section, are adapted for position in the groove 54 for rotation with the quill shaft, and provide a plurality of separate annular portions for compression against the adjacent inner surfaces of the elements 52 and 53 at a plurality of positions axially of each other. The sealing means 60 and the seal flange 52 may assume any of a plurality of axial positions relative to each other, for reasons set forth above.

In operation, the slinger 56 serves to keep the oil away from the seal elements 52 and 60 at the time of relative movement, when oil has a greater tendency to pass between them.

As shown in Figure 2, a device 64, constituting a modification of the device 40, instead of having a plurality of separate rings or elements corresponding to the rings 60 of Figure 1, comprises a single integral ring body 66 of similar material having a plurality of separate annular portions 68 for compression, in this form, against the inner surface of a seal flange element 70, corresponding to the flange element 52, at a plurality of positions axially of each other, and providing for positioning of the sealing means 66 and the seal flange 70 at any of a plurality of axial positions relative to each other.

In this example, the flange 70 is part of a single piece of sheet metal having a collar 72, an annular portion 76, and a radial disc web 78.

Also, means 80, corresponding to the means 53, is similar to the latter, but differs to accommodate the modified yieldable sealing means 64.

Although only two embodiments of the invention have been illustrated and described, various changes in the form and relative arrangements of the parts may be made to suit requirements.

What is claimed is:

A fluid seal structure adapted for use between a housing and a rotable shaft extending therefrom, comprising a baffle having a radially extending web, an outer axially extending tubular portion extending into the housing from the web, an inner axially extending tubular portion extending into the housing from the same side of the web as the outer tubular portion and spaced radially from the outer tubular portion, a shoulder on the outer tubular portion, a seal ring between the shoulder and the housing, a sleeve on the shaft having a groove therein, a radially extending slinger extending from the sleeve on the side of the web opposite from which the tubular portions extend, and sealing means in the groove and engaging the inner tubular portion.

MARTIN J. NEUNER.

REFERENCES CITED

The following references are of record in the file of this patent:

UNITED STATES PATENTS

| Number | Name | Date |
|---|---|---|
| 1,238,731 | Anderson | Sept. 4, 1917 |
| 1,503,920 | Schneebeli | Aug 5, 1924 |

FOREIGN PATENTS

| Number | Country | Date |
|---|---|---|
| 308,391 | Great Britain | of 1929 |